US012154368B1

(12) United States Patent
Chandran et al.

(10) Patent No.: US 12,154,368 B1
(45) Date of Patent: Nov. 26, 2024

(54) MOVABLE FINGERPRINT SCANNING FOR ROLLABLE DISPLAY DEVICE

(71) Applicant: MOTOROLA MOBILITY LLC, Wilmington, DE (US)

(72) Inventors: Amal Chandran, Bangalore (IN); Jilji N. Elayath, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/320,871

(22) Filed: May 19, 2023

(51) Int. Cl.
*G06V 40/13* (2022.01)
*G06F 1/16* (2006.01)
*G06F 21/32* (2013.01)

(52) U.S. Cl.
CPC ............ *G06V 40/13* (2022.01); *G06F 1/1624* (2013.01); *G06F 1/1652* (2013.01); *G06F 21/32* (2013.01)

(58) Field of Classification Search
CPC ..... G06V 40/13; G06F 1/1624; G06F 1/1652; G06F 21/32
See application file for complete search history.

(56) References Cited

U.S. PATENT DOCUMENTS

| 2021/0326569 | A1* | 10/2021 | Song | G06F 1/1652 |
| 2023/0016622 | A1* | 1/2023 | Gudivada | G06F 21/44 |
| 2023/0036424 | A1* | 2/2023 | Kim | G06F 1/1624 |

* cited by examiner

*Primary Examiner* — Lixi C Simpson
(74) *Attorney, Agent, or Firm* — Isidore PLLC

(57) ABSTRACT

An electronic device, method, and computer program product provide a predictable external finger area on a "rollable display device" for fingerprint authentication that is dynamically aligned to a fixed finger location on a device housing of the electronic device. The electronic device has a translation mechanism operable to position with a blade assembly having a flexible display that retracts to reduce size of the electronic device for carrying or stowing. The transmission extends the blade assembly to increase display area of a flexible display on a front side of a device housing of the electronic device. A fingerprint scanner that moves with the flexible display is sized to capture a fingerprint at a fixed finger area on a device housing of the electronic device for each position of the blade assembly between the retract position and the extended position. The fingerprint of a user is used to authenticate the user.

20 Claims, 11 Drawing Sheets

MOVABLE FINGERPRINT SCANNING FOR ROLLABLE DISPLAY DEVICE

BACKGROUND

1. Technical Field

The present disclosure relates generally to communication devices having a sliding or translating form factor, and in particular to communication devices that have a single housing and a rollable flexible display that slides or translates.

2. Description of the Related Art

Portable electronic communication devices, particularly smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device and corresponding methods that not only provide a compact geometric form factor but that also allow for the use of a larger display surface area as well. Changing display size is not the only consideration. In addition, design forms that change configuration for a smaller size for stowing present a challenge in incorporating biometric sensors for authentication in a predictable, accessible location.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
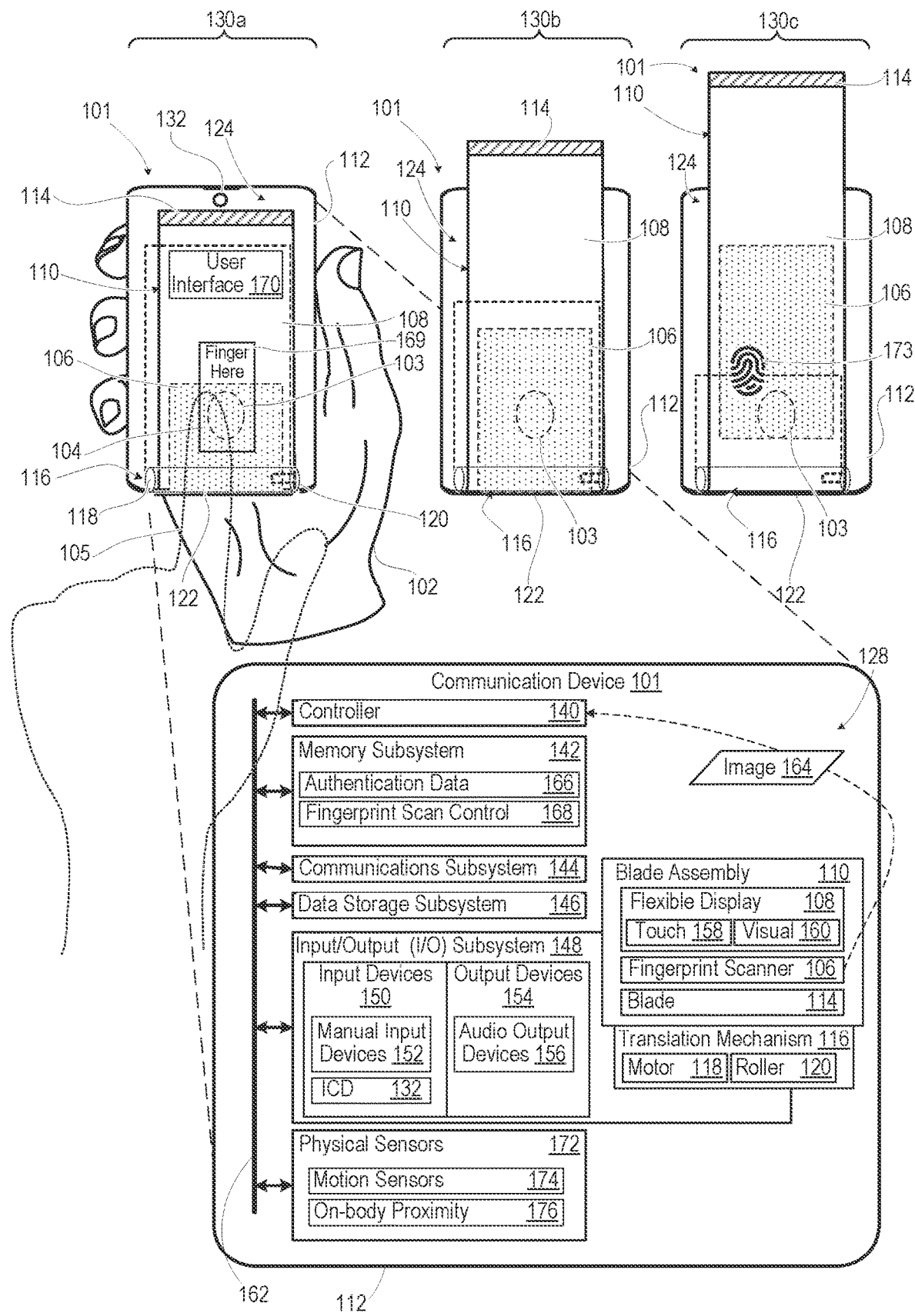
FIG. 1 presents a simplified functional block diagram of a communication device, shown with front views of the rollable display in a retracted position, a partially extended position, and a fully extended position, while automatically capturing a fingerprint of a user for authentication, according to one or more embodiments.

According to aspects of the present disclosure, an electronic device, a method, and a computer program product provide a "rollable display device" that has a flexible display which retracts to provide a small form factor for stowing or carrying and extends to a larger display size when in use. When authentication is required, the electronic device supports capturing a fingerprint at an external finger area on a blade assembly that is dynamically aligned to an underlying fixed finger area on a device housing of the electronic device. The external finger area is maintained in dynamic alignment to the fixed finger area regardless of whether the blade assembly is retracted or extended. From a subjective external point of view of a user of the electronic device, the aligned external finger area and underlying fixed finger area are one "finger area" that is predictable and consistent to facilitate presenting of a fingerprint for authentication. In one or more embodiments, the electronic device includes the device housing having a front side and a back side. The front side has a finger area designated for placement of a finger of a user for receiving a fingerprint for user authentication. The blade assembly is slidably coupled to the device housing. The blade assembly includes a blade, a fingerprint scanner, and a flexible display attached to the blade. A translation mechanism is operable to slide the blade assembly relative to the device housing between an extended position and a retracted position. The fingerprint scanner is integrated underneath the flexible display. The fingerprint scanner translates with the flexible display. The fingerprint scanner is sized to cover at least a portion of the front side of the device housing having the finger area, enabling the fingerprint scanner to capture a fingerprint while the blade assembly is positioned at any position between the retracted position and the extended position. A controller of the electronic device is communicatively coupled to the blade assembly and the translation mechanism. In response to identifying a condition in which authentication of a user is required, the controller determines, based on a current position of the blade assembly, a portion of the fingerprint scanner that overlies the finger area. The controller triggers at least the portion of the fingerprint scanner to capture an image of a fingerprint detected at the finger area. The controller authenticates the user in response to identifying that the fingerprint in the image corresponds to that of an authorized user.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 2:
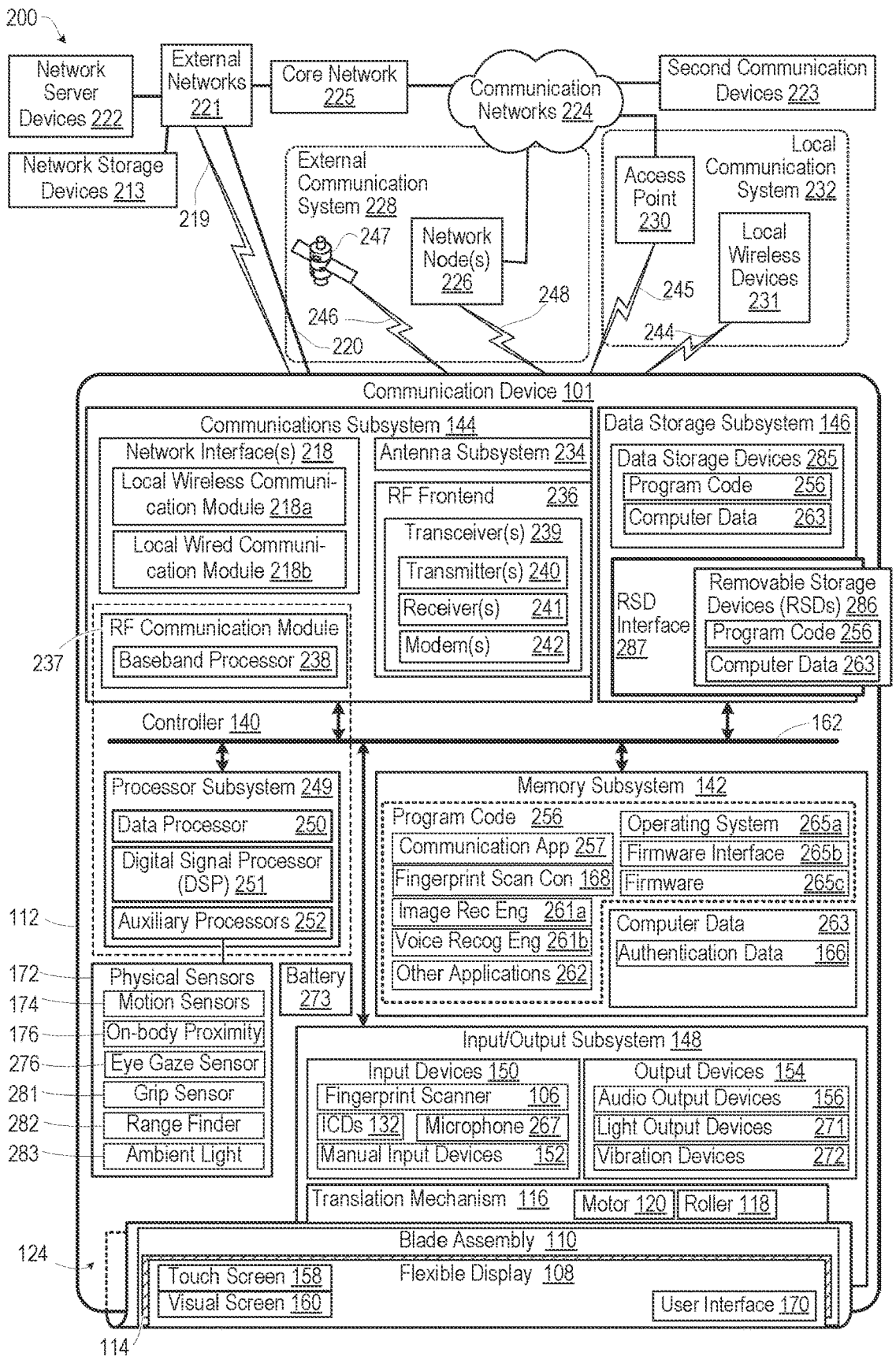
FIG. 2 depicts a functional block diagram of a communication environment including the communication device of FIG. 1, according to one or more embodiments.

FIG. 1 presents a simplified functional block diagram of an electronic device that is a rollable display device, referenced herein as communication device 101, and in which the features of the present disclosure are advantageously implemented. FIG. 2 is a functional block diagram of a communication environment 200 that includes communication device 101 and in which additional optional features, such as wireless communication components, are introduced below. With continued reference to FIG. 1, communication device 101 facilitates authentication of a user 102 by supporting finger area 103 that is at fixed location for capturing fingerprint 104 of finger 105 of user 102. Finger area 103 does not necessarily change location when fingerprint scanner 106 moves with flexible display 108 of blade assembly 110 to change a display area. Fingerprint scanner 106 enables capture of fingerprint 104 while blade assembly 110 is positioned at any position between the retracted position and the extended position. Blade assembly 110 is slidably coupled to device housing 112 and includes fingerprint scanner 106, blade 114, and flexible display 108 attached to blade 114. Translation mechanism 116, having roller 118 driven by motor 120, is positioned on bottom edge 122 of device housing 112. Translation mechanism 116 is operable to slide blade assembly 110 relative to device housing 112 between an extended position and a retracted position between front side 124 and back side 126 (FIGS. 3A-3C) of device housing 112. For clarity, communication device 101 has blade assembly 110 extending upwardly; however, orientation of communication device 101 may be changed to extend blade assembly 110 laterally right or left or vertically downward.

Figures 3A, 3B, 3C:
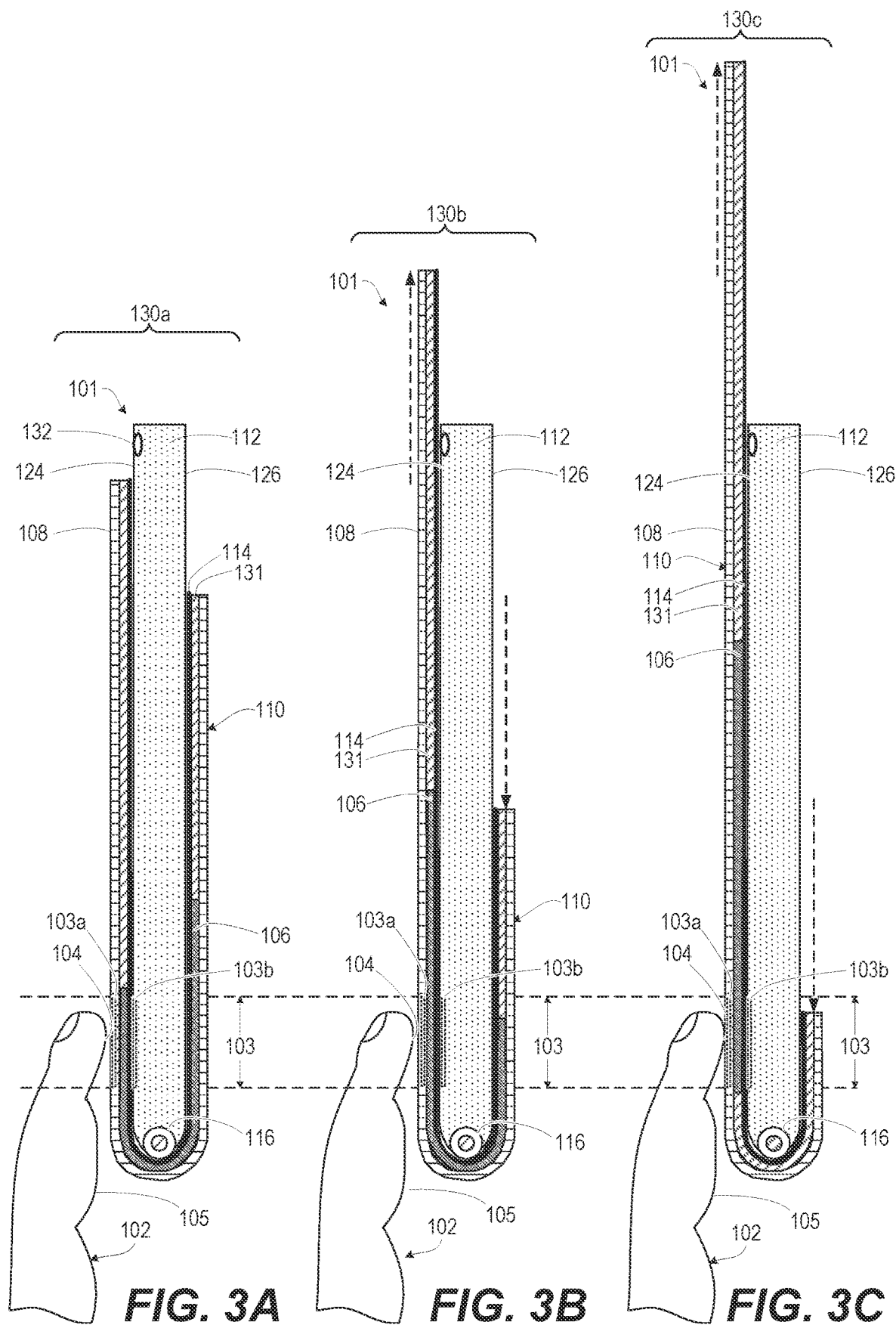
FIG. 3A depicts a left side view of the example communication device having a blade assembly in a fully retracted position with a finger of a user positioned at the fixed finger area, according to one or more embodiments.
FIG. 3B depicts a left side view of the example communication device of FIG. 3A having the blade assembly in a partially extended position with the finger of the user positioned at the fixed finger area, according to one or more embodiments.
FIG. 3C depicts a left side view of the example communication device of FIG. 3A having the blade assembly in a fully extended position with the finger of the user positioned at the fixed finger area, according to one or more embodiments.

With reference to FIG. 3A, when authentication is required, communication device 101 supports capturing fingerprint 104 at external finger area 103a on blade assembly 110 that is dynamically aligned to an underlying fixed finger area 103b on device housing 112 of communication device 101. External finger area 103a is maintained in dynamic alignment to fixed finger area 103b regardless of whether blade assembly 110 is retracted (FIG. 3A), partially extended (FIG. 3B), or fully extended (FIG. 3C). From a subjective external point of view of user 102 of communication device 101, external finger area 103a and fixed finger area 103b are one "finger area" (103) that is predictable and consistent to facilitate presenting of fingerprint 104 for authentication.

In addition to the simplified block diagram of functional components 128, FIG. 1 depicts front views of communication device 101 with blade assembly 110 in the retracted position at 130a, in a partially extended position at 130b, and in the fully extended position at 130c, which correspond respectively to side views of FIGS. 3A-3C. FIG. 3A depicts a left side view of communication device 101 having blade assembly 110 in the fully retracted position with finger 105 of user 102 positioned at finger area 103. In one or more embodiments, fingerprint scanner 106 is a midportion of scanner substrate 131 (FIG. 3A) sandwiched between flexible display 108 and blade 114 that is positioned by translation mechanism 116. With reference to FIGS. 1 and 3A, front image capturing device (ICD) 132 is exposed when blade assembly 110 is in the fully retracted position. In addition, the size of communication device 101 is reduced, making communication device 101 easy to carry and stow. Fingerprint scanner 106 is integrated underneath flexible display 108 and translates with flexible display 108 as translation mechanism 116 positions blade 114. Fingerprint scanner 106 is sized to cover at least a portion of front side 124 of device housing 112 including finger area 103. Rolling display form factor of communication device 101 accomplishes an adjustable display area of flexible display 108 using a relatively thin blade assembly 110 that moves relative to a single device housing (112). By contrast, clamshell and slider tray design forms require two device housings that move relative to each other, pivoting and translating respectively, to accomplish a change in presented display size and device size. Requiring two device housings increases the thickness of the overall form factor, which may be undesirable for stowing and carrying. In the retracted position, all of flexible display 108 of blade assembly 110 is exposed and may be operable on front side 124 and back side and 126 (FIG. 3A). This is unlike the clamshell form factor that hides a display when folded/closed and the sliding tray form factor that hides part of a display when retracted.

FIG. 3B depicts a left side view of communication device 101 having blade assembly 110 in a partially extended position with finger 105 of user 102 positioned at finger area 103 that is fixed. With reference to FIGS. 1 and 3B, finger scanner 106 is sized to cover finger area 103 even though blade assembly 110 is partially extended to increase display area of flexible display 108 on front side 124 of device housing 112. FIG. 3C depicts a left side view of communication device 101 having blade assembly 110 in a fully extended position with finger 105 of user 102 positioned at finger area 103 that is fixed. With reference to FIGS. 1 and 3C, finger scanner 106 is sized to cover finger area 103 even though blade assembly 110 is fully extended to increase display area of flexible display 108 on front side 124 of device housing 112. In each position of blade assembly 110, authentication of user 102 using fingerprint scanner 106 is supported through the range of positions of blade assembly 110. When partially or fully extended, display area viewable on front side 124 is increased as compared to the retracted position.

With particular reference to FIG. 1, functional components 128 of communication device 101 include controller 140, memory subsystem 142, communications subsystem 144, data storage subsystem 146, and input/output (I/O) subsystem 148. I/O subsystem 148 includes I/O devices such as flexible display 108, other input devices 150 such as image capturing device (ICD) 132, and manual input devices 152 (e.g., keys and buttons). I/O devices further includes other output devices 154 such audio output device 156. In one or more embodiments, flexible display 108 includes touch screen 158, which is an example of input devices 150, and includes visual screen 160, which is an example of output device 154. To enable management by controller 140, system interlink 162 communicatively connects controller 140 with memory subsystem 142, communications subsystem 144, data storage subsystem 146, and I/O subsystem 148.

In one or more embodiments, controller 140 executes rolling fingerprint scan control 168 to configure fingerprint scanner 106 for capturing fingerprint 104. Fingerprint scan control 168 may be program code stored in memory subsystem 142, such as an application, utility, firmware or module executed by at least one microprocessor. Controller 140 may monitor input devices 150 such as manual input devices 152 or touch inputs detected by touch screen 158 of flexible display 108 to determine an authentication requirement. Controller 140 may monitor physical sensors 172 such as motion sensors 174 and on-body proximity sensor 176 to determine an authentication requirement. In response to determining that an authentication requirement exists, controller 140 captures image 164 via fingerprint scanner 106. With reference to authentication data 166 in memory subsystem 142, controller 140 authenticates user 102 in response to identifying fingerprint 104 in image 164 corresponding to an authorized user. In one or more embodiments, controller 140 unlocks or activates flexible display 108 in response to authenticating user 102 by identifying fingerprint 104 in image 164 as corresponding to the authorized user. With access to one or more functions of communication device 101 enabled, controller 140 may activate translation mechanism 116 to position blade assembly 110 to a position between the retracted position and the extended position to present visual content and to present visual prompt 169 for guiding touch inputs via flexible display 108.

In one or more embodiments, controller 140 monitors at least one physical sensor 172, such as motion sensor 174, or input device 150, such as touch screen 158 of flexible display 108, that is configured to detect a user attending to communication device 101. Controller 140 identifies the condition in which authentication of user 102 is required based on detecting a change from user 102 not attending to communication device 101 to the user attending to communication device 101.

In one or more embodiments, in response to identifying a condition in which authentication of user 102 is required, controller 140 determines, based on a current position of blade assembly 110, a portion of fingerprint scanner 106 that overlies finger area 103. Controller 140 triggers at least the portion of fingerprint scanner 106 to capture image 164 of fingerprint 104 detected at finger area 103. Controller 140 authenticates user 102 in response to identifying that fingerprint 104 in image 164 corresponds to that of an authorized user. In one or more embodiments, controller 140 presents visual prompt 169 via flexible display 108 indicating finger area 103 of flexible display 108 for receiving fingerprint 104. In one or more embodiments, controller 140 activates the portion of fingerprint scanner 106 at finger area 103 to capture fingerprint 104. In one or more embodiments, controller 140 unlocks or activates user interface 170 presented on flexible display 108 in response to authenticating user 102 by identifying fingerprint 104 in image 164 as corresponding to the authorized user.

In one or more embodiments, controller 140 activates fingerprint scanner 106 to capture an uncropped image. In an example, controller 140 activates portions of fingerprint scanner 106 positioned over, and not extending beyond, the front side of the device housing to capture the uncropped image from areas of fingerprint scanner 106 directly supported by device housing 112. Controller 140 dynamically determines a finger area based on identifying fingerprint shape 173 contained in the uncropped image.

FIG. 2 is a functional block diagram of a communication environment 200 that includes communication device 101 and in which additional optional features, such as wireless communication, of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the additional specific component makeup and the associated functionality of the presented components. System interlink 162 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 162) are illustrated in FIGS. 1-2, it is to be understood that more, fewer, or different interconnections may be present in other embodiments.

In one or more embodiments, communications subsystem 144 may include one or more network interfaces 218, such as local wireless communication module 218a and local wired communication module 218b, to communicatively couple communication device 101 respectively via wireless connection 219 or network cable 220 to external networks 221. Communication device 101, via external networks 221, may connect to network storage devices 213 that store computer data and to network server devices 222 that facilitate access to network storage devices 213. Network server devices 222 may have identical or similar components and functionality as described above for communication device 101. Communication device 101 may communicate with second communication devices 223 via external networks 221 or via communication networks 224 that are supported by core networks 225. Network interface(s) 218 may include a network interface controller (NIC) and support one or more network communication protocols. External networks 221 can include a local area network (LAN), a campus area network (CAN), a metropolitan area network (MAN), or a wide area network (WAN). For example, wireless connection 219 and network cable 220 can be an Ethernet connection/cable.

In one or more embodiments, communications subsystem 144 may include additional functionality for communicating, using a cellular connection, with network node(s) 226 of external communication system 228 and for communicating, using a wireless connection, with wireless access point 230 or local wireless devices 231 of local communication system 232. Communications subsystem 144 includes antenna subsystem 234. Communications subsystem 144 includes radio frequency (RF) front end 236 and RF communication module 237 having baseband processor 238. RF front end 236 includes transceiver(s) 239, which includes transmitter(s) 240 and receiver(s) 241. RF front end 236 further includes modem(s) 242. Baseband processor 238 of RF communication module 237 communicates with controller 140 and RF front end 236. Baseband processor 238 operates in a baseband frequency range to encode data for transmission and decode received data, according to a communication protocol. Modem(s) 242 modulates baseband encoded data from RF communication module 237 onto a carrier signal to provide a transmit signal that is amplified by transmitter(s) 240. Modem(s) 242 demodulates each signal received using antenna subsystem 234 from external communication system 228 or local communication system 232. The received signal is amplified and filtered by receiver(s) 241, which demodulates received encoded data from a received carrier signal.

In one or more embodiments, controller 140, via communications subsystem 144, performs multiple types of cellular over-the-air (OTA) or wireless communication with local communication system 232. Communications subsystem 144 can communicate via an OTA connection 244 with local wireless devices 231. In an example, OTA connection 244 is a Bluetooth connection, or other personal access network (PAN) connection. In one or more embodiments, communications subsystem 234 communicates with one or more locally networked devices via a wireless local area network (WLAN) link 245 supported by access point 230. In one or more embodiments, access point 230 supports communication using one or more IEEE 802.11 WLAN protocols. Access point 230 is connected to communication networks 224 via a cellular or wired connection. In one or more embodiments, communications subsystem 144 receives downlink channels 246 from GPS satellites 247 to obtain geospatial location information. Communications subsystem 144 can communicate via an over-the-air (OTA) cellular connection 248 with network node(s) 226.

Controller 140 includes processor subsystem 249, which includes one or more central processing units (CPUs), depicted as data processor 250. Processor subsystem 249 can include one or more digital signal processors 251 that can be integrated with data processor 250. Processor subsystem 249 can include other processors that are communicatively coupled to data processor 250, such as baseband processors 238 of communication module 237. In another example, auxiliary processors 252 may act as a low power consumption, always-on sensor hub for physical sensors 172. In one or more embodiments that are not depicted, controller 140 can further include distributed processing and control components that are external to housing 112 or grouped with other components, such as I/O subsystem 148. Data processor 250 is communicatively coupled, via system interlink 162, to memory subsystem 132. In one or more embodiments, data processor 250 is communicatively coupled via system interlink 162 to communications subsystem 144, data storage subsystem 146 and I/O subsystem 148. Controller 140 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 132 stores program code 256 for execution by processor subsystem 249 to provide the functionality described herein. Program code 256 includes applications such as communication application 257 that receives or generates visual content or user interface 170. Program code 256 includes rolling fingerprint scan control 168 that may be software or firmware that controls activation of fingerprint scanner 106 for authenticating fingerprint 104 (FIG. 1). Program code 256 may include applications or utilities, such as image recognition engine 261a and voice recognition engine 261b, and other applications 262. In one or more embodiments, several of the described aspects of the present disclosure are provided via executable program code of applications executed by controller 140. In one or more embodiments, program code 256 may be integrated into a distinct chipset or hardware module as firmware that operates separately from executable program code. Portions of program code 256 may be incorporated into different hardware components that operate in a distributed or collaborative manner. Implementation of program code 256 may use any known mechanism or process for doing so using integrated hardware and/or software, as known by those skilled in the art. Program code 256 may access, use, generate, modify, store, or communicate computer data 263, such as authentication data 166.

Computer data 263 may incorporate "data" that originated as raw, real-world "analog" information that consists of basic facts and figures. Computer data 263 includes different forms of data, such as numerical data, images, coding, notes, and financial data. Computer data 263 may originate at communication device 101 or be retrieved by communication device 101. Communication device 101 may store, modify, present, or transmit computer data 263. Computer data 263 may be organized in one of a number of different data structures. Common examples of computer data 263 include video, graphics, text, and images as discussed herein. Computer data 263 can also be in other forms of flat files, databases, and other data structures.

Memory subsystem 132 further includes operating system (OS) 265a, firmware interface 265b, such as basic input/output system (BIOS) or Uniform Extensible Firmware Interface (UEFI), and firmware 265c, which may be considered as program code 256.

I/O subsystem 148 includes input devices 150, output devices 154, and I/O devices, such as flexible display 108. Input devices 150 may include fingerprint scanner 106, image capturing devices (ICDs) 132, manual input devices 152 (e.g., keys and buttons), microphone 267. Output devices 154 may include audio output devices 156, light output devices 271, and vibration device 272. Vibration device 272 oscillates a mass such as battery 273 to create vibratory alerts.

Physical sensors 172 provides additional contextual indications of the use and environment of communication device 101. Examples of physical sensors 172 include motion sensors 174 or motion detectors such as accelerometers that detect when communication device 101 is being moved by user 102 (FIG. 1) or is stationary on a surface, such as table. Physical sensors 172 may include eye gaze sensor 276 that detects whether user 102 (FIG. 1) is looking toward communication device 101. Physical sensors 172 may include on-body proximity sensors 174 that detects proximity to a lossy dielectric mass (i.e., hand or body of user 102 (FIG. 1), such as when communication device 101 is placed in a pocket. Physical sensors 172 may include grip sensors 281 exteriorly presented on housing 112 detecting when communication device 101 is being held in hand of user 102 (FIG. 1). Physical sensors 172 may include range finder 282 and ambient light sensor 283. Controller 140 automatically responds to contexts, determined at least in part on physical sensors 172, by positioning blade assembly 110 of communication device 101 in one configuration from among: (i) a retracted configuration when communication device 101 is stowed in a pocket, (ii) a partially extended "peek" configuration when a notification is received, or (iii) an extended configuration when communication device 101 is in hand of user 102 (FIG. 1) or when a larger display output is required for presenting content.

Data storage subsystem 146 of communication device 101 includes data storage device(s) 285. Controller 140 is communicatively connected, via system interlink 162, to data storage device(s) 285. Data storage subsystem 146 provides program code 256 and computer data 263 stored on non-volatile storage that is accessible by controller 140. For example, data storage subsystem 146 can provide a selection of program code 256 and computer data 263. These applications can be loaded into memory subsystem 132 for execution/processing by controller 140. In one or more embodiments, data storage device(s) 285 can include hard disk drives (HDDs), optical disk drives, and/or solid-state drives (SSDs), etc. Data storage subsystem 146 of communication device 101 can include removable storage device(s) (RSD(s)) 286, which is received in RSD interface 287. Controller 140 is communicatively connected to RSD 286, via system interlink 162 and RSD interface 287. In one or more embodiments, RSD 286 is a non-transitory computer program product or computer readable storage device. Controller 140 can access data storage device(s) 285 or RSD 286 to provision communication device 101 with program code 256.

Figure 4:
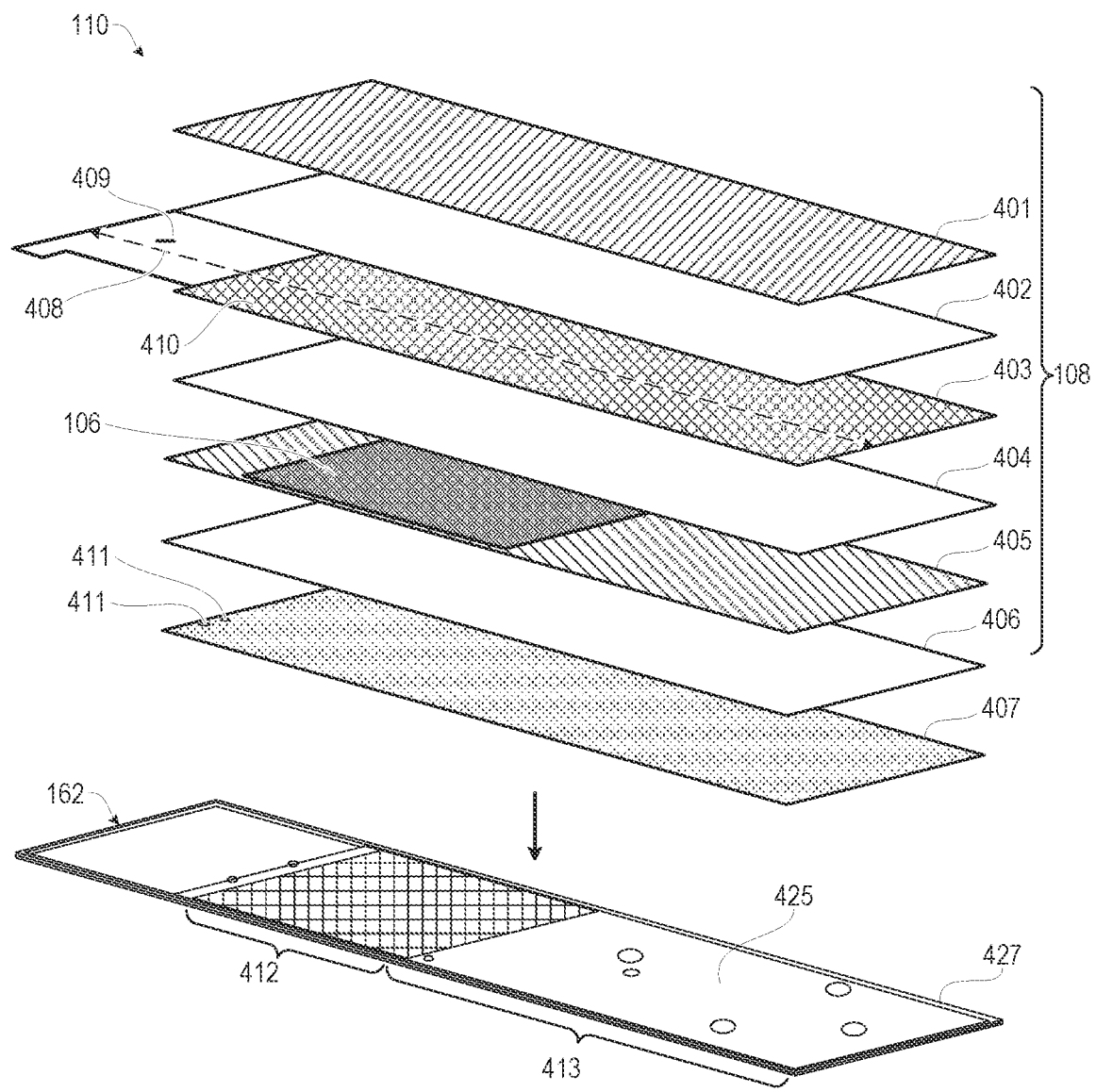
FIG. 4 depicts a blade assembly with a blade and with a flexible display and fingerprint scanner in an exploded view, according to one or more embodiments.

FIG. 4 illustrates blade assembly 110 with blade 114 and with flexible display 108 in an exploded view. In one or more embodiments, flexible display 108 includes one or more layers that are coupled or laminated together to complete flexible display 108. In an example, flexible display 108 includes flexible protective cover 401, first adhesive layer 402, flexible display layer 403, second adhesive layer 404, scanner substrate 405 that supports fingerprint scanner 106, third adhesive layer 406, and flexible substrate 407. Beginning from the top of the layer stack opposite to blade 114, in one or more embodiments, flexible protective cover 401 includes an optically transparent substrate such as a thin film sheet of a thermoplastic material. In an example, flexible protective cover 401 is manufactured from a layer of optically transparent polyamide or polycarbonate having a thickness of about eighty microns. Flexible protective cover 401 may function as a fascia by defining a cover for flexible display layer 403. In one or more embodiments, flexible protective cover 401 is optically transparent, in that light can pass through the flexible protective cover 401 so that objects behind flexible protective cover 401 can be distinctly seen. Flexible protective cover 401 may optionally include an ultra-violet barrier. Such a barrier can be useful in improving the visibility of flexible display layer 403.

Beneath flexible protective cover 401 is first adhesive layer 402. In one or more embodiments, first adhesive layer 402 is an optically transparent adhesive. The optically transparent adhesive can be applied to two sides of a thin, optically transparent substrate such that the first adhesive layer 402 functions as an optically transparent layer having optically transparent adhesive on both sides. Where so configured as "double-sided tape", first adhesive layer 402 may have a thickness of about fifty microns that can then be spooled and applied between, to couple together, flexible protective cover 401 and flexible display layer 403. In other embodiments, first adhesive layer 402 may be applied between flexible protective cover 401 and the display layer 403 as an optically transparent liquid or gel that is allowed to cure or optionally cured by heat, ultraviolet light, or other techniques. First adhesive layer 402 mechanically couples flexible display layer 403 to flexible protective cover 401.

In one or more embodiments, flexible display layer 403 is situated between scanner substrate 405 and flexible protective cover 401. Flexible display layer 403 includes image producing portion 409 having a same length and width, and aligned with, flexible protective cover 401 and flexible substrate 407. In one or more embodiments, flexible display layer 403 includes T-shaped tongue 410 attached along major axis 408 of flexible display layer 403. Blade 114 is sized to receive flexible display layer 403 attached to T-shaped tongue 410. In one or more embodiments, electronic circuit components configured to operate image producing portion 409 of the flexible display layer 403, connectors, and other components can be coupled to this T-shaped tongue 410 and further coupled to image producing portion 409 of flexible display 108. For instance, as shown in FIG. 4, flexible display layer 403 includes a T-shaped tongue 410 that extends beyond image producing portion 409 of flexible display layer 403 and other layers (401, 402, 404, 405, 406, and 407) of flexible display 108. While T-shaped tongue 410 is T-shaped in this illustrative embodiment, T-shaped tongue 410 can take other shapes.

Flexible display layer 403 optionally may be touch-sensitive. In one or more embodiments, flexible display layer 403 is an organic light emitting diode (OLED) display layer. When coupled to scanner substrate 405 and flexible substrate 407, flexible display layer 403 can bend in accordance with various bending radii. For example, some embodiments allow bending radii of between thirty and six hundred millimeters. Other substrates allow bending radii of around five millimeters to provide a display that is foldable through active bending. Other configurations of flexible display 108 may accommodate both bends and folds. In one or more embodiments, flexible display layer 403 may be formed from multiple layers of flexible material such as flexible sheets of polymer or other materials. Flexible display layer 403 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 403 has a thickness of about 130 microns.

In one or more embodiments, to be touch sensitive, flexible display layer 403 includes a layer including one or more optically transparent electrodes. In one or more embodiments, flexible display layer 403 includes an organic light emitting diode layer configured to present images and other information to user 102 (FIG. 1). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 403. In one or more embodiments, flexible substrate 407 includes a thin layer of steel having a thickness of about thirty microns. In one or more embodiments, flexible substrate 407 includes a thin layer of thermoplastic material.

In one or more embodiments, flexible display layer 403 is coupled to scanner substrate 405 by second adhesive layer 404. In one or more embodiments, second adhesive layer 404 is identical to the first adhesive layer 402 and includes an optically transparent adhesive. Fingerprint scanner 106 may be implemented as a pattern sensor designed with thin film transistor (TFT) technology. Fingerprint scanner 106 may include an acquisition element, such as a photoelectric acquisition element, a pyroelectric acquisition element or a capacitance acquisition element, and one or more TFTs that can control this acquisition element, respectively. Alternatively, the pattern sensor may have a plurality of basic acquisition cells (or pixels) on a supporting substrate. In an example, TFT technology may provide a transistor formed by continuously forming a conductive and insulating semiconductor layer over a supporting substrate. TFTs may be formed by depositing layers of semiconductor materials such as hydrogenated amorphous silicon, polysilicon (e.g., polycrystalline silicon after annealing) or indium gallium zinc oxide (IGZO) type material. Thus, a semiconductor channel formation region of a transistor may be formed, and a conductive layer used for forming a gate electrode, a source electrode, or a drain electrode of the transistor may be formed before such film formation. Pattern sensors formed in TFT technology are compared by using a support substrate formed from a low-cost material such as glass instead of the single crystal silicon substrate commonly used to form transistors. TFT technology may provide a pattern sensor whose sensor surface is substantially the same as the surface of the resulting pattern (e.g., fingerprint, footprint or palmprint). The pattern requires no optical focusing system (or lens) to be placed between the pattern sensor and the object for which image acquisition is desired.

In one or more embodiments, scanner substrate 405 is coupled to flexible substrate 407 by third adhesive layer 406. In one or more embodiments, third adhesive layer 406 is identical to the first adhesive layer 402 and includes an optically transparent adhesive. However, since third adhesive layer 406 is coupled between flexible display layer 403 and the flexible substrate 407, i.e., under the flexible display layer 403, an optically transparent adhesive is not a requirement. Third adhesive layer 406 may be partially optically transparent or not optically transparent. Regardless of whether third adhesive layer 406 is optically transparent, in one or more embodiments, adhesive of the third adhesive layer 406 is applied to two sides of a thin, flexible substrate. Where so configured, in one or more embodiments, third adhesive layer 406 has a thickness of about fifty microns. This extremely thin version of "double-sided tape" can then be spooled and applied between, to couple together flexible display layer 403 and flexible substrate 407. In other embodiments, as with first adhesive layer 402, third adhesive layer 406 may instead be applied between flexible display layer 403 and flexible substrate as a liquid or gel that is passively cured or that is actively cured by heat, ultraviolet light, or other techniques.

In other embodiments, a layer (401-402) above flexible display layer 403 may be configured with enough stiffness to make the flexible substrate 407 unnecessary. In an example, flexible protective cover 401 is configured with enough stiffness to provide sufficient protection for flexible display 108 during bending, enabling flexible substrate 407 to be omitted.

Flexible display 108 is supported by flexible substrate 407 and by blade 114 having blade substrate 425. In one or more embodiments, blade substrate 425 includes a layer of steel. In one or more embodiments, blade substrate 425 is thicker than flexible substrate 407. In an example, flexible substrate 407 includes a steel layer with a thickness of about thirty microns and blade substrate 425 includes a layer of steel having a thickness of about one hundred microns. In one or more embodiments, blade substrate 425 is a rigid, substantially planar support layer. In an example, blade substrate 425 may be manufactured from stainless steel, from a thin, rigid thermoplastic sheet, or from nitinol material, which is a nickel-titanium alloy.

In one or more embodiments, the flexible substrate 407 is slightly longer along a major axis of the flexible substrate 407 than is the image producing portion 409 of the flexible display 108. Since the T-shaped tongue 410 is T-shaped, this allows one or more apertures 411 to be exposed on either side of the base of the T of the T-shaped tongue 410. As will be described in more detail below, this extra length along the major axis provided by the flexible substrate 407 allows one or more fasteners to rigidly couple the first end of the flexible substrate 407 to a tensioner.

Embodiments of the disclosure contemplate that some of the layers comprising the flexible display 108 are stiffer than others. Similarly, other layers of the flexible display 108 are softer than others. For example, where the flexible substrate 407 is manufactured from a metal, one example of which is stainless steel, this layer is stiffer than either the first adhesive layer 402 or the third adhesive layer 406. In one or more embodiments, the stainless steel is stiffer than the flexible display layer 403 as well. In one or more embodiments, the flexible substrate 407 is the stiffest layer in the flexible display 108, while the first adhesive layer and the third adhesive layer 406 are the softest layers of the flexible display 108. The flexible protective cover 401 and the flexible display layer 403 have a stiffness that falls between that of the flexible substrate 407 and the adhesive layers in one or more embodiments.

In one or more embodiments, the various layers of the flexible display 108 are laminated together in a substantially planar configuration. Said differently, in one or more embodiments the flexible substrate 407 is configured as a substantially planar substrate. The third adhesive layer 406 can be attached to this substantially planar substrate, with the flexible display layer 403 then attached to the third adhesive layer 406. The first adhesive layer 402 can be attached to the flexible display layer 403, with the flexible protective cover 401 attached to the first adhesive layer 402. To ensure proper coupling, flexible display layer 403 can be cured, such as in an autoclave at a predefined temperature for a predefined duration. Where employed, such curing allows any air bubbles or other imperfections in the various layers to be corrected. In one or more embodiments, flexible substrate 407 is configured as a substantially planar substrate resulting in flexible display 108 being substantially planar.

In one or more embodiments, blade substrate 425 of blade 114 includes both flexible portion 412 and rigid portion 413. Flexible portion 412 is positioned to encounter bending in translation of blade assembly 110 from the retracted position to the extended position. Rigid portion 413 is positioned to remain on front side 124 of device housing 112 (FIG. 1) during translation. In the extended position, rigid portion 413 extends beyond front side 124 of device housing 112 (FIG. 1). In an example, blade substrate 425 is manufactured from a metal such as steel having a thickness of one hundred microns that provides rigidity to rigid portion 413.

In one or more embodiments, blade 114 includes silicone border 427 positioned around a perimeter of blade substrate 425 to protect the edges of flexible display 108 when attached to blade substrate 425 of blade 114. In one or more embodiments, silicone border 427 is co-molded around the perimeter of blade substrate 425.

In one or more embodiments, rigid portion 413 of blade substrate 425 can define one or more apertures. These apertures can be used for a variety of purposes. In an example, some of the apertures can be used to rigidly fasten blade 114 to translation mechanism 116 (FIG. 1), such as a display roller mechanism. Additionally, some of the apertures can contain magnets. Hall-effect sensors positioned in device housing 112 (FIG. 1) to which blade assembly 110 is coupled can then detect the positions of these magnets such that controller 140 (FIG. 1) can determine whether blade assembly 110 including flexible display 108 are in the extended position, the retracted position, the peek position, or an intermediate position.

In one or more embodiments, flexible display 108 is coupled to blade substrate 425 of blade 114 within the confines of silicone border 427. In an example, a first end of flexible display 108 is adhesively coupled to rigid portion 413 of blade substrate 425 of blade 114. The other end of flexible display 108 may be rigidly coupled to a tensioner by passing fasteners through apertures 411 of flexible substrate 407.

Figure 5:
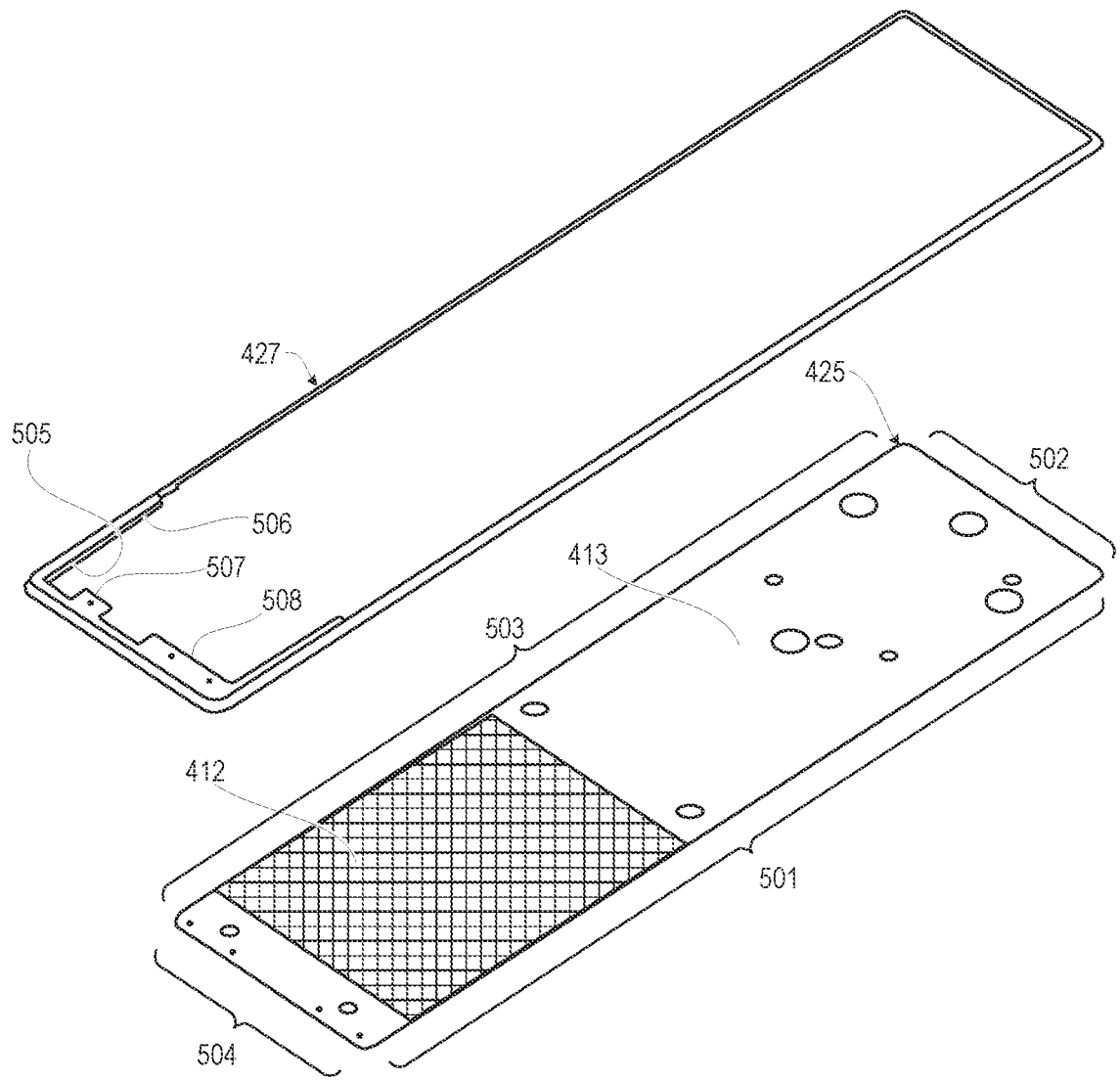
FIG. 5 depicts a blade substrate and a silicone border in an exploded view, according to one or more embodiments.

FIG. 5 depicts blade substrate 425 and silicone border 427 shown in an exploded view. Silicone border 427 defines a singular, contiguous, unitary piece of silicone. In the illustrative embodiment of FIG. 5, silicone border 427 surrounds three sides 501, 502, and 503 of blade substrate 425, and extends beyond minor side 504 to define receiving recess 505 that can accommodate mechanical and electrical components such as electronic circuit components to provide power and control for flexible display 108 (FIG. 4) that will situate within the perimeter defined by silicone border 427. A tensioner may keep flexible display 108 (FIG. 4) flat across flexible portion 412 of blade substrate 425, flexible circuits, and other components. In one or more embodiments, portions 506, 507, 508 of silicone border 427 extending beyond minor side 504 of blade substrate 425 surrounding receiving recess 505 are thicker than are the other portions of silicone border 427 that will surround flexible display 108 (FIG. 4), enabling components to be placed within receiving recess 505.

Figure 6:
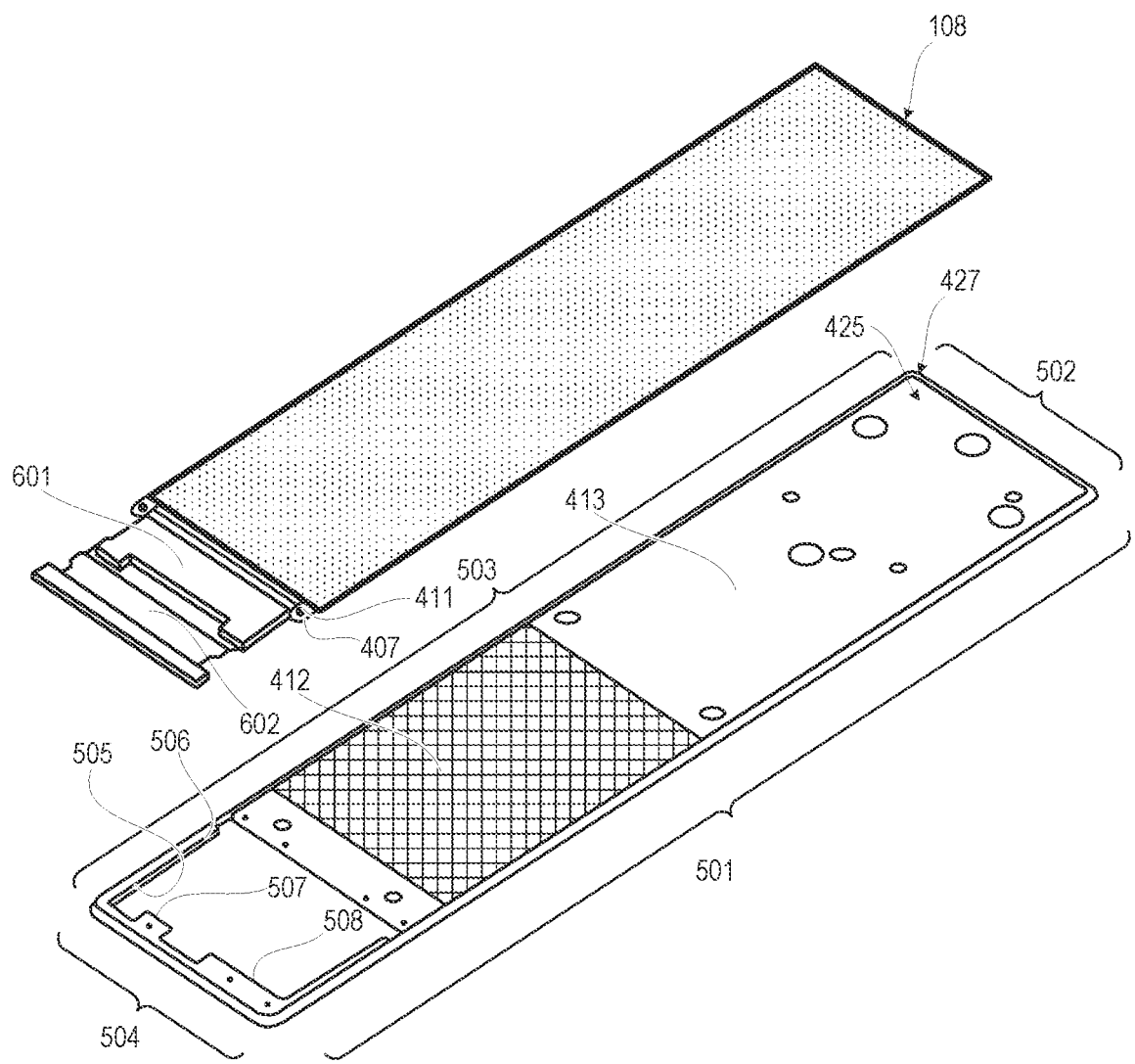
FIG. 6 depicts the flexible display and the blade with silicone border over-molded on the blade substrate, according to one or more embodiments.

FIG. 6 depicts flexible display 108 and blade 114 with silicone border 427 over-molded on blade substrate 425. Silicone border 427 surrounds three sides 501, 502, and 503 of blade substrate 425 and extends beyond minor side 504 to define receiving recess 505 that can accommodate mechanical and electrical components. Electronic circuits 601 that are operable to provide power and control for flexible display 108 have been coupled to T-shaped tongue 410 of flexible display layer 403 (FIG. 4). Additionally, mechanical connector 602 has been connected to the top of the T on T-shaped tongue 410. Flexible substrate 407 extends beyond a distal end of flexible display layer 403 (FIG. 4) so that apertures 411 defined therein can be coupled to a tensioner to ensure that flexible display 108 stays flat around flexible portion 412 of blade substrate 425 when flexible portion 412 of blade substrate 425 passes around a rotor positioned at the end of device housing 112 (FIG. 1).

In one or more embodiments, blade 114 can be fixedly coupled to flexible display 108. In an example, flexible display 108 is coupled to rigid portion 413 by an adhesive or other coupling mechanism. A tensioner can then be positioned in receiving recess 505. In one or more embodiments, the tensioner rigidly couples with fasteners to the apertures 411 (FIG. 4) of flexible substrate 407 (FIG. 4) to keep flexible display 108 flat across flexible portion 412, regardless of how flexible portion 412 is being bent around the minor surface of device housing 112 or a corresponding rotor.

Figure 7:
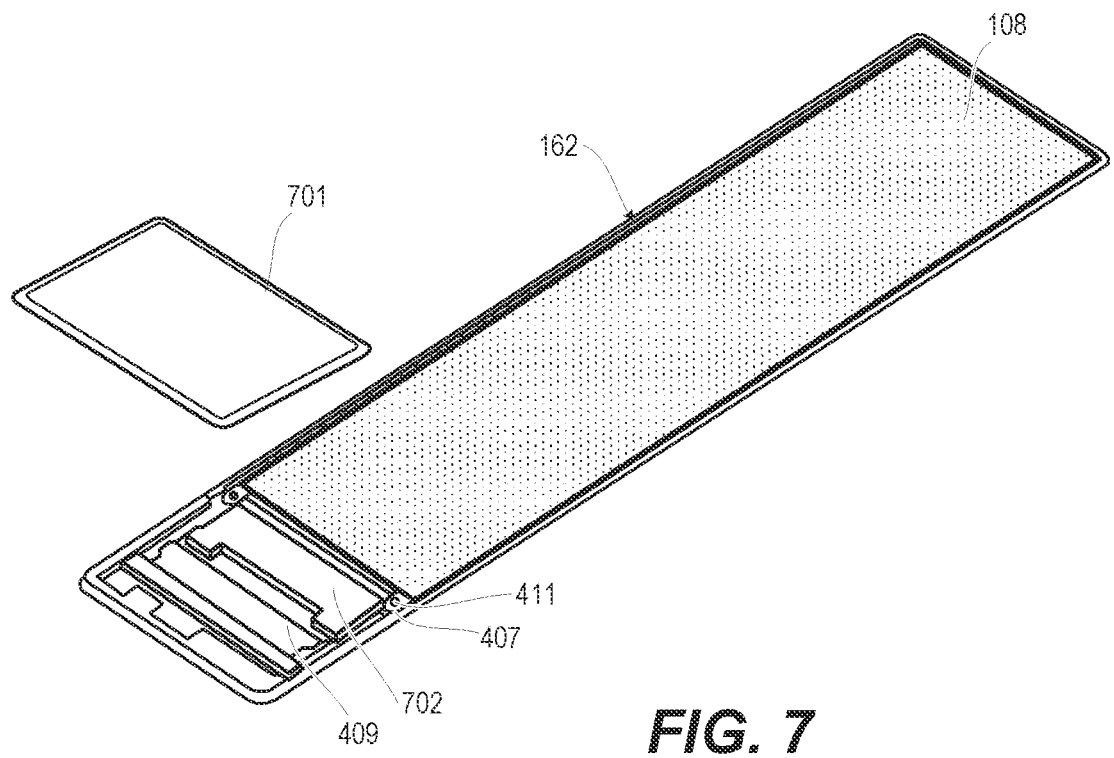
FIG. 7 depicts the flexible display after being coupled to the blade surrounded by a silicone border, according to one or more embodiments.
Figure 8:
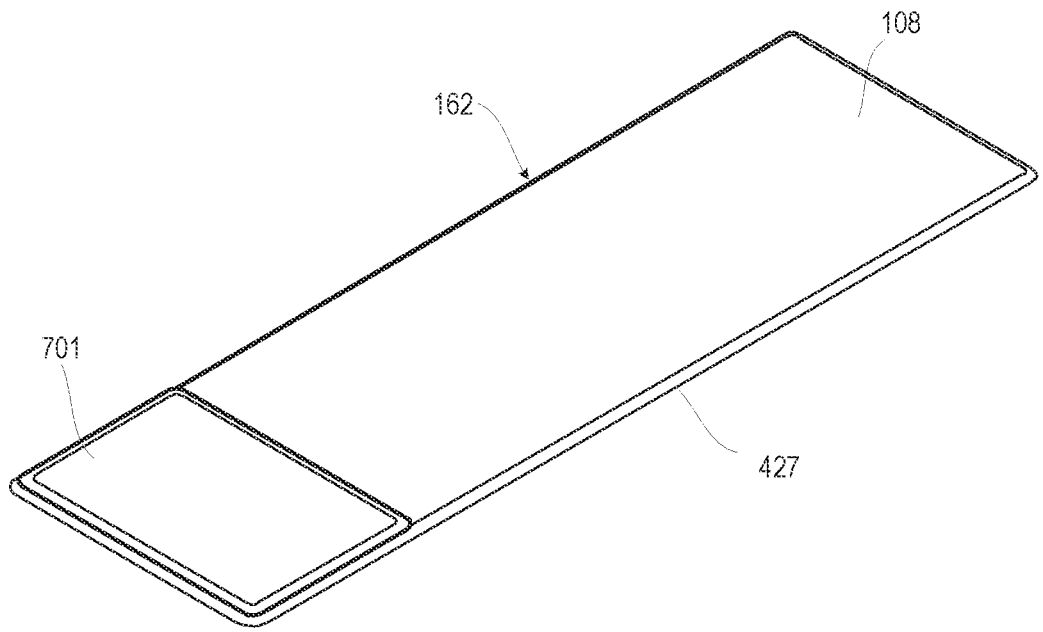
FIG. 8 depicts the blade assembly completely configured with a cover and in an unrolled state, according to one or more embodiments.

FIG. 7 depicts flexible display 108 after being coupled to blade 114. Silicone border 427 surrounds the flexible display 108, with silicone border 427 surrounding and abutting three sides of the flexible display layer (403). A flexible substrate is then connected to the electronic circuits 601 carried by the T-shaped tongue 410. Additionally, a tensioner can be coupled to the flexible substrate 407. Thereafter, cover 701 is attached to silicone border 427 atop the electronic circuits 702 and other components situated on or around the T-shaped tongue 410. This portion of blade assembly 110 where the components are stored beneath cover 701 may be referred to as the "backpack." FIG. 8 depicts blade assembly 110 completely configured with cover 701.

Figure 9:
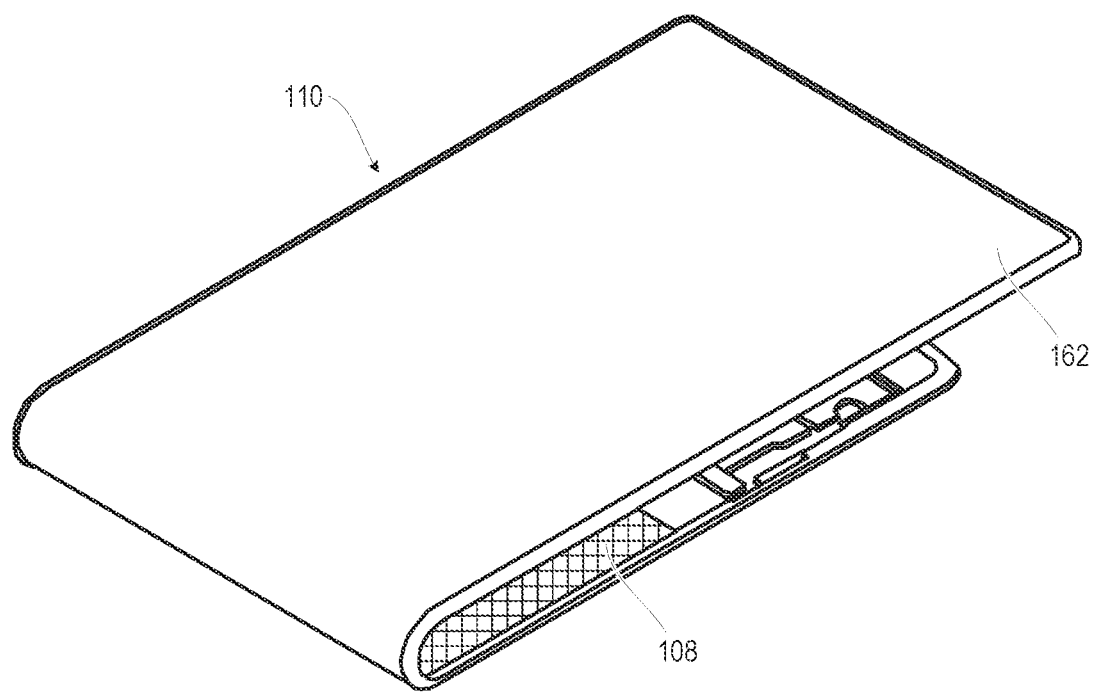
FIG. 9 depicts the blade assembly in a fully retracted state, according to one or more embodiments.
Figure 10:
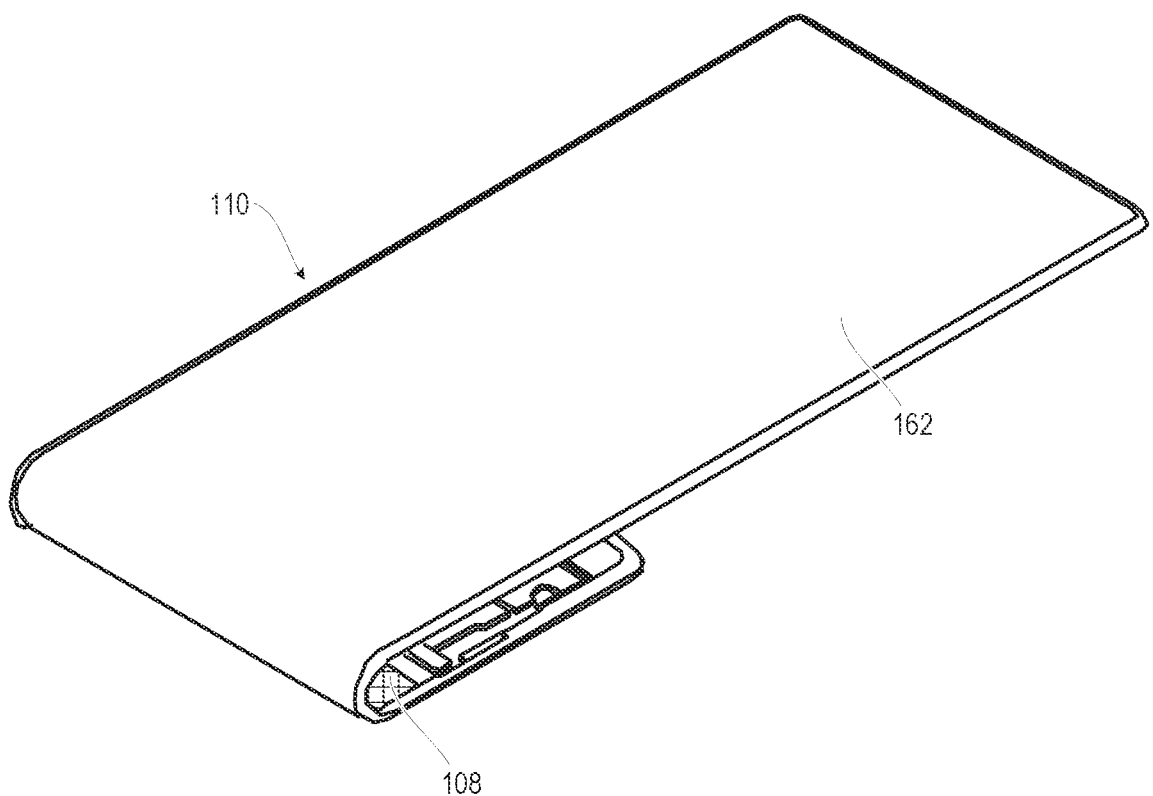
FIG. 10 depicts the blade assembly in a fully extended state, according to one or more embodiments.

FIG. 9 depicts blade assembly 110 in a fully retracted state. FIG. 10 depicts blade assembly 110 in a fully extended state. In one or more embodiments, flexible display 108 and blade 114 are configured to wrap around a minor surface of device housing 112 (FIG. 1) where a display roller mechanism is situated. In one or more embodiments, the display roller mechanism includes a rotor that is positioned within a curvilinear section of flexible display 108 and blade 114. When placed within device housing 112 (FIG. 1), translation of translation mechanism 116 (FIG. 1) causes translation of blade assembly 110, which in turn causes rotation of the rotor. The result is a linear translation of the flexible display 108 and blade 114 across a translation surface of device housing 112 (FIG. 1) by drawing flexible display 108 and the blade 114 around the rotor. As previously described, blade substrate 425 (FIG. 4) of blade assembly 110 includes flexible portion 412 (FIG. 4) that allows blade 114 and flexible display 108 to deform around device housing 112 (FIG. 1), corresponding to the respective points of rolling depicted in FIGS. 9-10.

Figure 11:
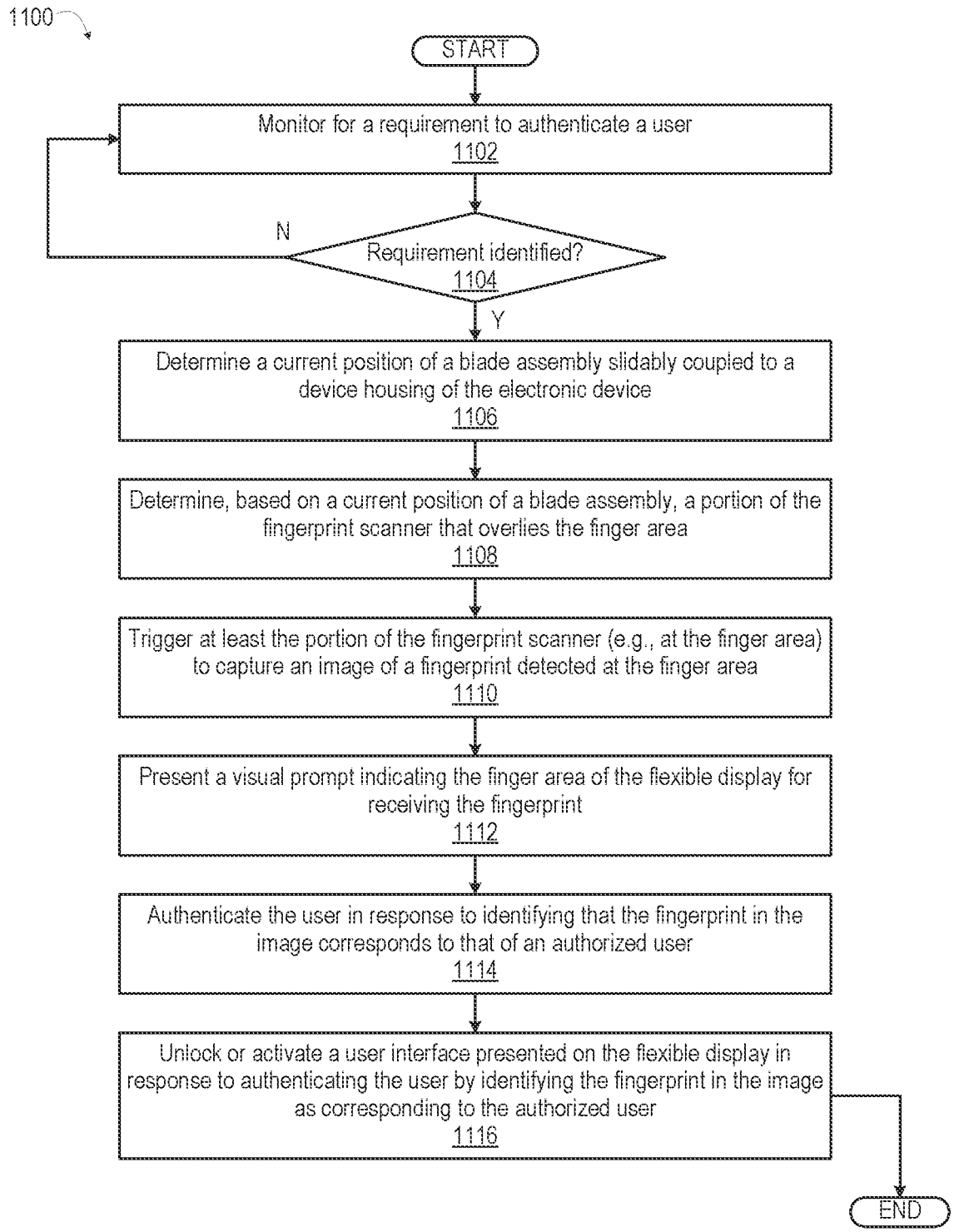
FIG. 11 is a flow diagram presenting a method of supporting fingerprint authentication at a fixed finger area as a fingerprint scanner is positioned with a flexible display between a retracted position and an extended position, according to one or more embodiments.
Figure 12:
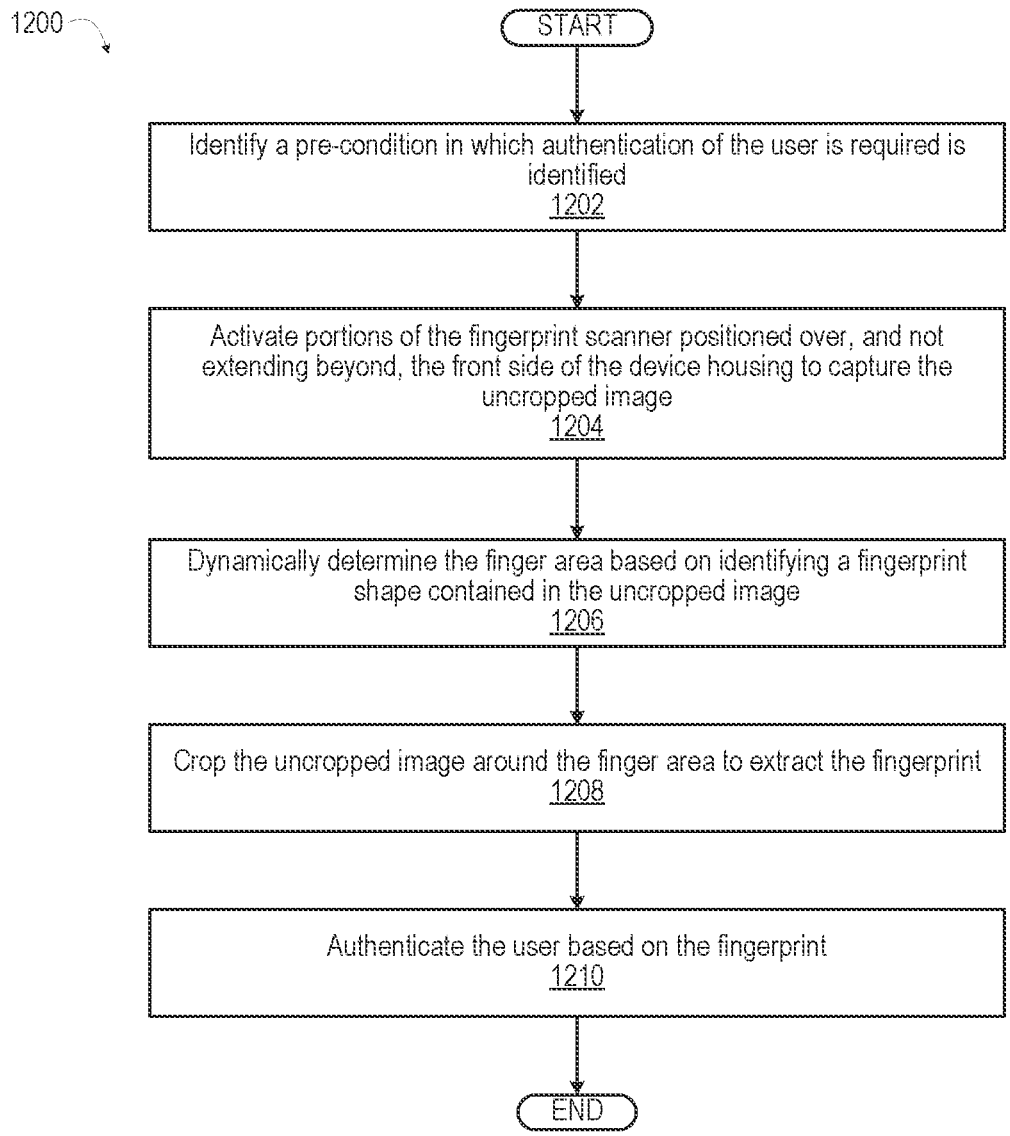
FIG. 12 is a flow diagram of a method of dynamically determining the finger area on a flexible display for fingerprint authentication, according to one or more embodiments.
Figure 13:
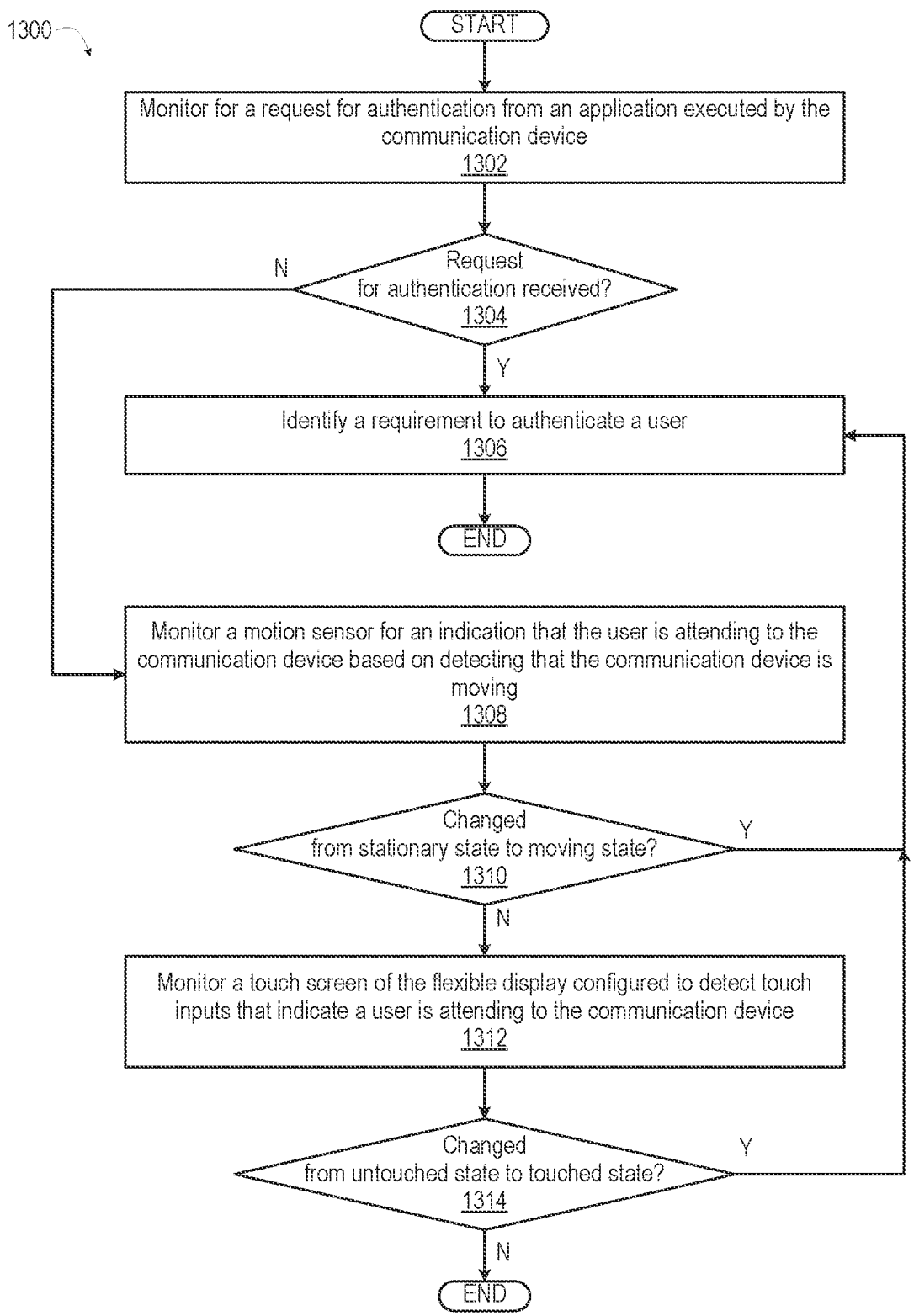
FIG. 13 is a flow diagram presenting a method for detecting a condition in which authentication of a user is required, according to one or more embodiments.

FIG. 11 is a flow diagram presenting method 1100 of supporting fingerprint authentication at a fixed finger area as a fingerprint scanner is positioned with a flexible display between a retracted position and an extended position. FIG. 12 is a flow diagram of a method of dynamically determining the finger area for fingerprint authentication. FIG. 13 is a flow diagram presenting method 1300 for detecting a condition in which authentication of a user is required. The descriptions of method 1100 (FIG. 11), method 1200 (FIG. 12), and method 1300 (FIG. 13) are provided with general reference to the specific components illustrated within the preceding FIGS. 1, 2, 3A-3C, and 4-10. Specific components referenced in method 1100 (FIG. 11), method 1200 (FIG. 12), and method 1300 (FIG. 13) may be identical or similar to components of the same name used in describing preceding FIGS. 1, 2, 3A-3C, and 4-10. In one or more embodiments, controller 140 (FIGS. 1-2) configures communication device 101 (FIGS. 1-2) to provide the described functionality of method 1100 (FIG. 11), method 1200 (FIG. 12), and method 1300 (FIG. 13).

With reference to FIG. 11, method 1100 includes monitoring for a requirement to authenticate a user (block 1102). Method 1100 includes determining whether a requirement to authenticate the user is identified (decision block 1104). In response to determining that no requirement to authenticate the user is identified, method 1100 returns to block 1102. In response to determining that the requirement to authenticate the user is identified, method 1100 includes determining a current position of a blade assembly slidably coupled to a device housing of the electronic device (block 1106). The device housing has a front side and a back side. The front side has a finger area designated for placement of a finger of a user for receiving a fingerprint for user authentication. The blade assembly includes a blade, a fingerprint scanner, and a flexible display attached to the blade. The blade assembly is positioned between an extended position and a retracted position by a translation mechanism operable to slide the blade assembly relative to the device housing.

Method 1100 includes determining, based on a current position of a blade assembly, a portion of the fingerprint scanner that overlies the finger area (block 1108). The fingerprint scanner is integrated underneath the flexible display. The fingerprint scanner translates with the flexible display. The fingerprint scanner is sized to cover at least a portion of the front side of the device housing having the finger area. The size of the fingerprint scanner enables capturing a fingerprint while the blade assembly is positioned at any position between the retracted position and the extended position. Method 1100 includes triggering at least the portion of the fingerprint scanner (e.g., the portion at or over the finger area) to capture an image of a fingerprint detected at the finger area (block 1110). In one or more embodiments, the active portion of the fingerprint scanner may be sufficiently illuminated to act as a prompt to the user. In one or more embodiments, method 1100 includes presenting a visual prompt indicating the finger area of the flexible display for receiving the fingerprint (block 1112). Method 1100 includes authenticating the user in response to identifying that the fingerprint in the image corresponds to that of an authorized user (block 1114). Method 1100 includes unlocking or activating a user interface presented on the flexible display in response to authenticating the user by identifying the fingerprint in the image as corresponding to the authorized user (block 1116). Then method 1100 ends.

With reference to FIG. 12, method 1200 includes identifying or detecting a pre-condition in which authentication of the user is required (block 1202). Method 1200 includes activating portions of the fingerprint scanner positioned over, and not extending beyond, the front side of the device housing to capture an uncropped image (block 1204). In one or more alternate embodiments, activated portions of the fingerprint scanner may extend onto a portion of the blade assembly that extends away from the device housing. In one or more embodiments, method 1200 includes dynamically determining the finger area based on identifying a fingerprint shape contained in the uncropped image (block 1206). Method 1200 includes cropping the uncropped image around the finger area to extract the fingerprint (block 1208). Method 1200 includes authenticating the user based on the fingerprint (block 1210). Then method 1200 ends.

With reference to FIG. 13, method 1300 may include monitoring for a request for authentication from an application executed by the communication device (block 1302). Method 1300 includes determining whether a request for authentication is received (decision block 1304). In response to determining that the request for authentication is received, method 1300 includes identifying a requirement to authenticate a user (block 1306). Then method 1300 ends.

In response to determining that the request for authentication is not received, method 1300 may include identifying a condition in which identification is required based in part on determining that the communication device was first left unattended. While being left unattended, the communication device may not necessarily be in the possession of an authorized user. A condition in which identification is required arises when a user is attending to the communication device after a period in which a user is not attending to the communication device. One or more sensors or functional components may indicate whether or not a user is attending to the communication device. In one or more embodiments, method 1300 may include identifying a condition in which authentication of a user is required based on detecting a change from the user not attending to the electronic device to the user attending to the electronic device.

In an example, method 1300 may include monitoring a motion sensor for an indication that the user is attending to the communication device based on detecting that the communication device is moving (block 1308). Method 1300 may include determining whether the communication device is changed from a stationary state to a moving state (decision block 1310). In response to determining that the communication device has changed from a stationary state to a moving state, method 1300 returns to block 1306.

In another example, in response to determining In response to determining that the communication device has not changed from a stationary state to a moving state, method 1300 includes monitoring a touch screen of the flexible display configured to detect touch inputs that indicate a user is attending to the communication device (block 1312). Method 1300 may include determining whether the touch screen has changed an untouched state to a touched state (decision block 1314). In response to determining that the touch screen has changed from the untouched state to the touched state, method 1300 returns to block 1306. In response to determining that the touch screen has not changed from changed from the untouched state to the touched state, method 1300 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a device housing having a front side and a back side, the front side having a fixed finger area designated for placement of a finger of a user for receiving a fingerprint for user authentication;
a blade assembly slidably coupled to the device housing, the blade assembly comprising a blade, a fingerprint scanner, and a flexible display attached to the blade;
a translation mechanism operable to slide the blade assembly relative to the device housing between an extended position and a retracted position;
the fingerprint scanner integrated underneath the flexible display, and which translates with the flexible display, the fingerprint scanner sized to cover at least a portion of the front side of the device housing having the fixed finger area, enabling the fingerprint scanner to capture a fingerprint at an external finger area of the blade assembly, the external finger area dynamically aligned with and overlying the fixed finger area, while the blade assembly is positioned at any position between the retracted position and the extended position; and
a controller communicatively coupled to the blade assembly and the translation mechanism, and which:
in response to identifying a condition in which authentication of a user is required:
determines, based on a current position of the blade assembly, a portion of the fingerprint scanner that overlies the fixed finger area;

triggers at least the portion of the fingerprint scanner to capture an image of a fingerprint detected at the fixed finger area; and
authenticates the user in response to identifying that the fingerprint in the image corresponds to that of an authorized user.

2. The electronic device of claim 1, wherein the controller presents a visual prompt via the flexible display indicating the external finger area of the flexible display aligned with the fixed finger area of the device housing for receiving the fingerprint.

3. The electronic device of claim 1, wherein the controller activates the portion of the fingerprint scanner at the external finger area to capture the fingerprint.

4. The electronic device of claim 1, wherein the controller:
activates the fingerprint scanner to capture an uncropped image; and
authenticates the user based on cropping the uncropped image around the external finger area.

5. The electronic device of claim 4, wherein the controller activates portions of the fingerprint scanner positioned over, and not extending beyond, the front side of the device housing to capture the uncropped image from areas of fingerprint scanner directly supported by the device housing.

6. The electronic device of claim 4, wherein the controller dynamically determines the external finger area based on identifying a fingerprint shape contained in the uncropped image.

7. The electronic device of claim 1, wherein the controller unlocks or activates a user interface presented on the flexible display in response to authenticating the user by identifying the fingerprint in the image as corresponding to the authorized user.

8. The electronic device of claim 1, further comprising at least one sensor communicatively coupled to the controller and configured to detect a user attending to the electronic device, and wherein the controller identifies the condition in which authentication of the user is required based on detecting a change from the user not attending to the electronic device to the user attending to the electronic device.

9. A method comprising:
in response to identifying a condition in which authentication of a user is required to access one or more functions of an electronic device:
determining a current position of a blade assembly slidably coupled to a device housing of the electronic device, the device housing having a front side and a back side, the front side having a fixed finger area designated for placement of a finger of a user for receiving a fingerprint for user authentication, the blade assembly comprising a blade, a fingerprint scanner, and a flexible display attached to the blade, the blade assembly positioned between an extended position and a retracted position by a translation mechanism operable to slide the blade assembly relative to the device housing;
dynamically determining, based on a current position of a blade assembly, a portion of the fingerprint scanner including an external finger area that is aligned with and overlies the fixed finger area, the fingerprint scanner integrated underneath the flexible display, and which translates with the flexible display, the fingerprint scanner sized to cover at least a portion of the front side of the device housing having the fixed finger area, enabling the fingerprint scanner to capture a fingerprint while the blade assembly is positioned at any position between the retracted position and the extended position;
triggering at least the portion of the fingerprint scanner to capture an image of a fingerprint detected at the finger area; and
authenticating the user in response to identifying that the fingerprint in the image corresponds to that of an authorized user.

10. The method of claim 9, further comprising presenting a visual prompt indicating the external finger area of the flexible display aligned with the fixed finger area of the device housing for receiving the fingerprint.

11. The method of claim 9, further comprising activating the portion of the fingerprint scanner at the external finger area to capture the fingerprint.

12. The method of claim 9, further comprising:
activating the fingerprint scanner to capture an uncropped image; and
authenticating the user based on cropping the uncropped image around the external finger area.

13. The method of claim 12, further comprising activating portions of the fingerprint scanner positioned over, and not extending beyond, the front side of the device housing to capture the uncropped image from areas of fingerprint scanner directly supported by the device housing.

14. The method of claim 12, further comprising dynamically determining the external finger area based on identifying a fingerprint shape contained in the uncropped image.

15. The method of claim 9, further comprising unlocking or activating a user interface presented on the flexible display in response to authenticating the user by identifying the fingerprint in the image as corresponding to the authorized user.

16. The method of claim 9, further comprising:
monitoring at least one sensor configured to detect a user attending to the electronic device; and
identifying the condition in which authentication of the user is required based on detecting a change from the user not attending to the electronic device to the user attending to the electronic device.

17. A computer program product comprising:
a non-transitory computer readable storage device; and
program code on the non-transitory computer readable storage device that when executed by a processor associated with an electronic device, the program code enables the electronic device to provide functionality of:
in response to identifying a condition in which authentication of a user is required to access one or more functions of the electronic device:
determining a current position of a blade assembly slidably coupled to a device housing of the electronic device, the device housing having a front side and a back side, the front side having a fixed finger area designated for placement of a finger of a user for receiving a fingerprint for user authentication, the blade assembly comprising a blade, a fingerprint scanner, and a flexible display attached to the blade, the blade assembly positioned between an extended position and a retracted position by a translation mechanism operable to slide the blade assembly relative to the device housing;
dynamically determining, based on a current position of a blade assembly, a portion of the fingerprint scanner including an external finger area that is aligned with and overlies the finger area, the fingerprint scanner integrated underneath the flexible display, and which translates with the flexible display, the fingerprint scanner sized to cover at least a portion of the front side of the device housing having the fixed finger area, enabling the fingerprint scanner to capture a fingerprint while the blade assembly is positioned at any position between the retracted position and the extended position;

triggering at least the portion of the fingerprint scanner to capture an image of a fingerprint detected at the finger area; and authenticating the user in response to identifying that the fingerprint in the image corresponds to that of an authorized user.

18. The computer program product of claim 17, wherein the program code enables the electronic device to provide functionality of:

presenting a visual prompt indicating the external finger area of the flexible display for receiving the fingerprint;

activating the portion of the fingerprint scanner at the external finger area to capture the fingerprint; and unlocking or activating a user interface presented on the flexible display in response to authenticating the user by identifying the fingerprint in the image as corresponding to the authorized user.

19. The computer program product of claim 17, wherein the program code enables the electronic device to provide functionality of:

activating the fingerprint scanner to capture an uncropped image;

dynamically determining the external finger area based on identifying a fingerprint shape contained in the uncropped image; and authenticating the user based on cropping the uncropped image around the finger area.

20. The computer program product of claim 17, wherein the program code enables the electronic device to provide functionality of:

monitoring at least one sensor configured to detect a user attending to the electronic device; and identifying the condition in which authentication of the user is required based on detecting a change from the user not attending to the electronic device to the user attending to the electronic device.

\* \* \* \* \*